United States Patent
Kalos et al.

(10) Patent No.: US 10,437,730 B2
(45) Date of Patent: Oct. 8, 2019

(54) READ CACHE SYNCHRONIZATION IN DATA REPLICATION ENVIRONMENTS

(71) Applicant: International Business Machines Corporation, Armonk, NY (US)

(72) Inventors: Matthew J. Kalos, Tucson, AZ (US); Peter G. Sutton, Lagrangeville, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/243,093

(22) Filed: Aug. 22, 2016

(65) Prior Publication Data

US 2018/0052622 A1 Feb. 22, 2018

(51) Int. Cl.
*G06F 12/08* (2016.01)
*G06F 12/0893* (2016.01)
(Continued)

(52) U.S. Cl.
CPC ........ *G06F 12/0893* (2013.01); *G06F 12/121* (2013.01); *H04L 67/1095* (2013.01);
(Continued)

(58) Field of Classification Search
CPC ...... G06F 3/0619; G06F 3/065; G06F 3/0685; G06F 11/2017; G06F 11/2064;
(Continued)

(56) References Cited

U.S. PATENT DOCUMENTS

| 7,386,664 B1 | 6/2008 | Roy et al. |
| 7,778,976 B2 | 8/2010 | D'Souza et al. |

(Continued)

FOREIGN PATENT DOCUMENTS

| WO | WO2008028803 A2 | 3/2008 |
| WO | WO2008084007 A1 | 7/2008 |
| WO | WO2014170810 A1 | 10/2014 |

OTHER PUBLICATIONS

Brooks, Charlotte, et al., "IBM System Storage Business Continuity: Part 2 Solutions Guide," IBM Redbook, Feb. 4, 2007.
(Continued)

*Primary Examiner* — Gary J Portka
(74) *Attorney, Agent, or Firm* — Nelson and Nelson; Daniel P. Nelson; Alexis V. Nelson (57) ABSTRACT

A method for synchronizing primary and secondary read cache in a data replication environment is disclosed. In one embodiment, such a method includes monitoring contents of a primary read cache at a primary site. The method periodically sends, from the primary site to a secondary site, information regarding the contents of the primary read cache, such as a list of storage elements cached in the primary read cache. In certain embodiments, the information also includes temperature information indicating how frequently the storage elements are accessed. The method uses, at the secondary site, the information to substantially synchronize a secondary read cache with the primary read cache. A corresponding system and computer program product are also disclosed herein.

20 Claims, 6 Drawing Sheets

(51) Int. Cl.
*H04L 29/08* (2006.01)
*G06F 12/121* (2016.01)
*G06F 11/20* (2006.01)

(52) U.S. Cl.
CPC .... *G06F 11/2069* (2013.01); *G06F 2201/805* (2013.01); *G06F 2201/82* (2013.01); *G06F 2212/1024* (2013.01)

(58) Field of Classification Search
CPC ............. G06F 11/2069; G06F 11/2082; G06F 12/0831; G06F 12/0893; G06F 2201/805; G06F 2201/82; G06F 2201/885; G06F 2212/60
USPC ................................ 711/120, 122, 124, 162
See application file for complete search history.

(56) References Cited

U.S. PATENT DOCUMENTS

| | | | |
|---|---|---|---|
| 8,560,886 | B1 | 10/2013 | Kekre et al. |
| 9,747,179 | B2* | 8/2017 | Maheshwari ....... G06F 11/1662 |
| 2002/0194442 | A1 | 12/2002 | Yanai et al. |
| 2005/0081091 | A1 | 4/2005 | Bartfai et al. |
| 2005/0182906 | A1* | 8/2005 | Chatterjee ............. G06F 11/201 |
| | | | 711/144 |
| 2005/0193179 | A1 | 9/2005 | Cochran et al. |
| 2005/0198411 | A1* | 9/2005 | Bakke ................. G06F 12/0804 |
| | | | 710/22 |
| 2006/0259721 | A1 | 11/2006 | Ohran |
| 2008/0065843 | A1 | 3/2008 | Bartfai et al. |
| 2008/0104346 | A1 | 5/2008 | Watanabe et al. |
| 2008/0104347 | A1 | 5/2008 | Iwamura et al. |
| 2008/0104443 | A1 | 5/2008 | Akutsu et al. |
| 2008/0229038 | A1 | 9/2008 | Kimura et al. |
| 2009/0043979 | A1 | 2/2009 | Jarvis |
| 2009/0070528 | A1 | 3/2009 | Bartfai et al. |
| 2009/0217085 | A1 | 8/2009 | Van Riel et al. |
| 2009/0249116 | A1 | 10/2009 | Bartfai et al. |
| 2009/0300304 | A1 | 12/2009 | Boyd et al. |
| 2010/0257142 | A1 | 10/2010 | Murphy et al. |
| 2010/0274983 | A1 | 10/2010 | Murphy et al. |
| 2010/0275055 | A1 | 10/2010 | Edel et al. |
| 2010/0325500 | A1 | 12/2010 | Bashir et al. |
| 2011/0185117 | A1 | 7/2011 | Beeston et al. |
| 2011/0208694 | A1 | 8/2011 | Bitar et al. |
| 2011/0264877 | A1 | 10/2011 | Amano |
| 2013/0110778 | A1 | 5/2013 | Taylor et al. |
| 2013/0204960 | A1 | 8/2013 | Ashok et al. |
| 2013/0262799 | A1 | 10/2013 | Saito |
| 2013/0311719 | A1 | 11/2013 | Doedline, Jr. et al. |
| 2013/0339786 | A1* | 12/2013 | Samanta ............ G06F 11/1666 |
| | | | 714/6.23 |
| 2014/0032838 | A1 | 1/2014 | Takeuchi et al. |
| 2014/0108345 | A1 | 4/2014 | Brown et al. |
| 2014/0108753 | A1 | 4/2014 | Benhase et al. |
| 2014/0108756 | A1 | 4/2014 | Brown et al. |
| 2014/0258608 | A1* | 9/2014 | Viswanatha ........ G06F 12/0873 |
| | | | 711/113 |
| 2014/0344526 | A1 | 11/2014 | Brown et al. |
| 2015/0312337 | A1* | 10/2015 | Keremane .......... H04L 67/1095 |
| | | | 709/217 |

OTHER PUBLICATIONS

List of IBM Patents or Patent Applications Treated as Related.
Jianfeng, Zhu, et al., "A Duplicate-Aware Data Replication", Japan-ChinaJ oint Workshop on Frontier of Computer Science and Technology, IEEE, Dec. 2008.

* cited by examiner

READ CACHE SYNCHRONIZATION IN DATA REPLICATION ENVIRONMENTS

BACKGROUND

Field of the Invention

This invention relates to systems and methods for synchronizing cache in data replication environments.

Background of the Invention

In data replication environments such as Peer-to-Peer-Remote-Copy ("PPRC") environments, data is mirrored from a primary storage device to a secondary storage device to maintain two identical copies of the data. The primary and secondary storage devices may be located up to several hundred kilometers from one another. In the event the primary storage device fails, I/O may be redirected to the secondary storage device, thereby enabling continuous data availability. When the primary storage device is repaired, I/O may be redirected back to the former primary storage device. The process of redirecting I/O from the primary storage device to the secondary storage device when a failure or other event occurs may be referred to as a HyperSwap.

HyperSwap is a function provided by IBM's z/OS operating system that provides continuous availability in the case of disk failures by maintaining synchronous copies of primary disk volumes on one or more secondary storage controllers. When a disk failure is detected at a primary site, a host system running the z/OS operating system identifies HyperSwap managed volumes. Instead of rejecting I/O requests, the host system uses the HyperSwap function to switch (or swap) information in internal control blocks so that I/O requests are driven against synchronous copies at the secondary site. Since the secondary volumes are identical copies of the primary volumes prior to the failure, the I/O requests will ideally succeed with minimal impact (i.e., delay in I/O response times) on the issuing applications. Unfortunately, although secondary volumes may contain identical copies of data in the primary volumes, the control unit cache at the secondary site may not be populated with the same data as cache at the primary site. This is because read requests are only executed at the primary control unit. This may cause a decrease in performance after swapping from primary volumes to secondary volumes, at least until cache at the secondary site can be fully populated with data most recently in use by the applications.

In view of the foregoing, what are needed are systems and methods to ensure that cache at a secondary site is synchronized with cache at a primary site. Ideally, such systems and methods will ensure that, after a swap has occurred, I/O performance at a secondary site will mirror as much as possible I/O performance at a primary site.

SUMMARY

The invention has been developed in response to the present state of the art and, in particular, in response to the problems and needs in the art that have not yet been fully solved by currently available systems and methods. Accordingly, the invention has been developed to provide systems and methods to synchronize primary and secondary read cache in data replication environments. The features and advantages of the invention will become more fully apparent from the following description and appended claims, or may be learned by practice of the invention as set forth hereinafter.

Consistent with the foregoing, a method for synchronizing primary and secondary read cache in a data replication environment is disclosed herein. In one embodiment, such a method includes monitoring contents of a primary read cache at a primary site. The method periodically sends, from the primary site to a secondary site, information regarding the contents of the primary read cache, such as a list of storage elements cached in the primary read cache. In certain embodiments, the information also includes temperature information indicating how frequently the storage elements are accessed. The method uses, at the secondary site, the information to substantially synchronize a secondary read cache with the primary read cache.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Figure 1:
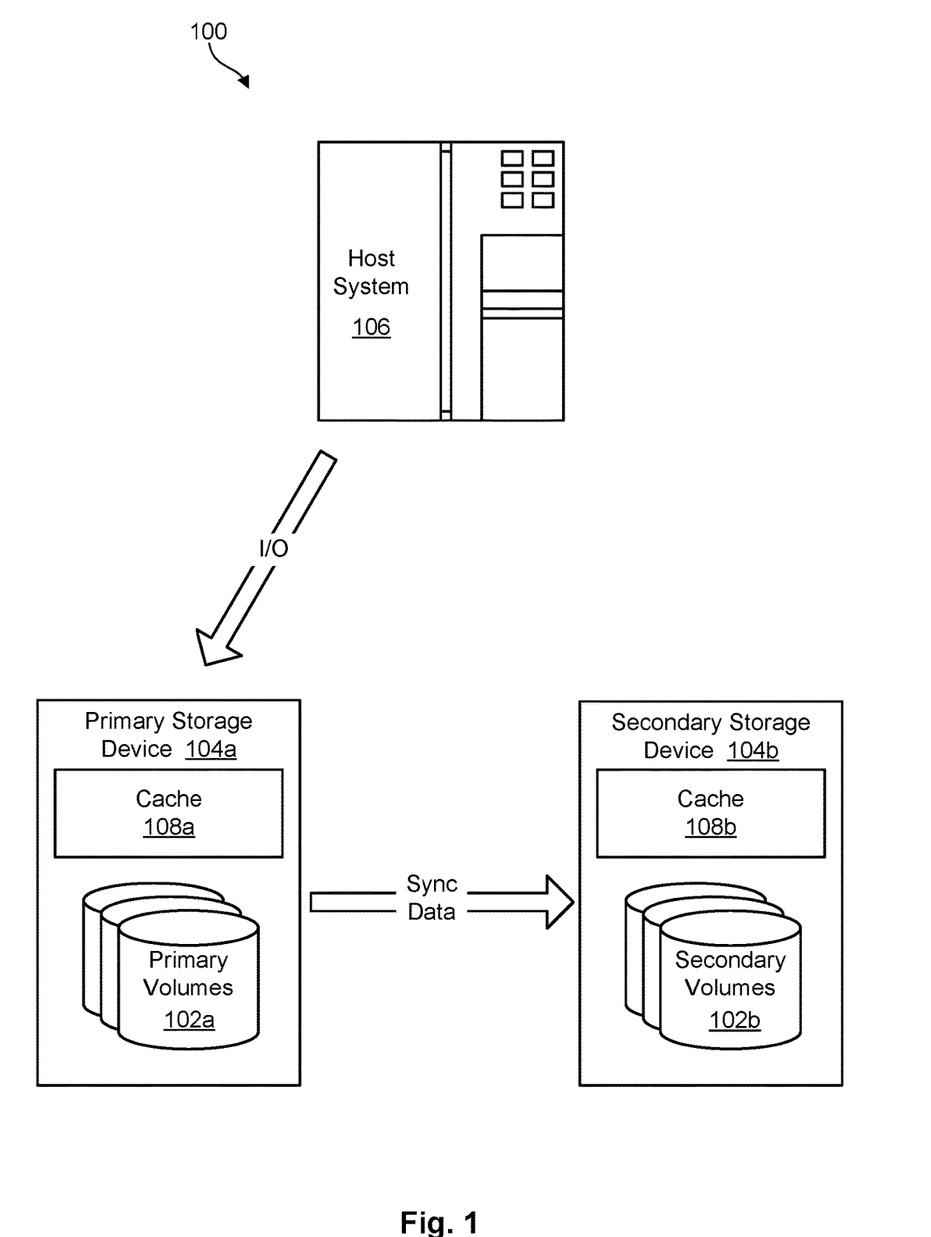
FIG. 1 is a high-level block diagram showing one example of a data replication environment, in this example a Peer-to-Peer-Remote-Copy ("PPRC") environment.

Referring to FIG. 1, one example of a data replication system 100, in this embodiment a PPRC system 100, is illustrated. The PPRC system 100 is presented to show an example of an architecture in which embodiments of the invention may operate, and is not intended to be limiting. In general, the PPRC system 100 establishes a mirroring relationship between one or more primary volumes 102*a* and one or more secondary volumes 102*b*. Once this relationship is established, a consistent copy of data is maintained on the volumes 102*a*, 102*b*. The primary and secondary volumes 102*a*, 102*b* may be located on the same storage device 104, although the volumes 102*a*, 102*b* are typically located on separate storage devices 104*a*, 104*b* located some distance (e.g., several miles to thousands of miles) from one another. Channel extension equipment may be located between the storage devices 104*a*, 104*b*, as needed, to extend the distance over which the storage devices 104*a*, 104*b* may communicate.

The data replication system 100 may, in certain embodiments, be configured to operate in either a synchronous or asynchronous manner. For example, referring to FIG. 3, while continuing to refer generally to FIG. 1, when operating synchronously, an I/O may only be considered complete when it has completed successfully on both the primary and secondary storage devices 104*a*, 104*b*. As an example, in such a configuration, a host system 106 may initially send a write request 300 to the primary storage device 104*a*. This write operation may be performed on the primary storage device 104*a*. The primary storage device 104*a* may, in turn, transmit a write request 302 to the secondary storage device 104*b*. The secondary storage device 104*b* may execute the write operation and return a write acknowledge signal 304 to the primary storage device 104*a*. Once the write has been performed on both the primary and secondary storage devices 104a, 104b, the primary storage device 104a returns a write acknowledge signal 306 to the host system 106. The I/O is only considered complete when the host 106 receives the write acknowledge signal.

Figure 3:
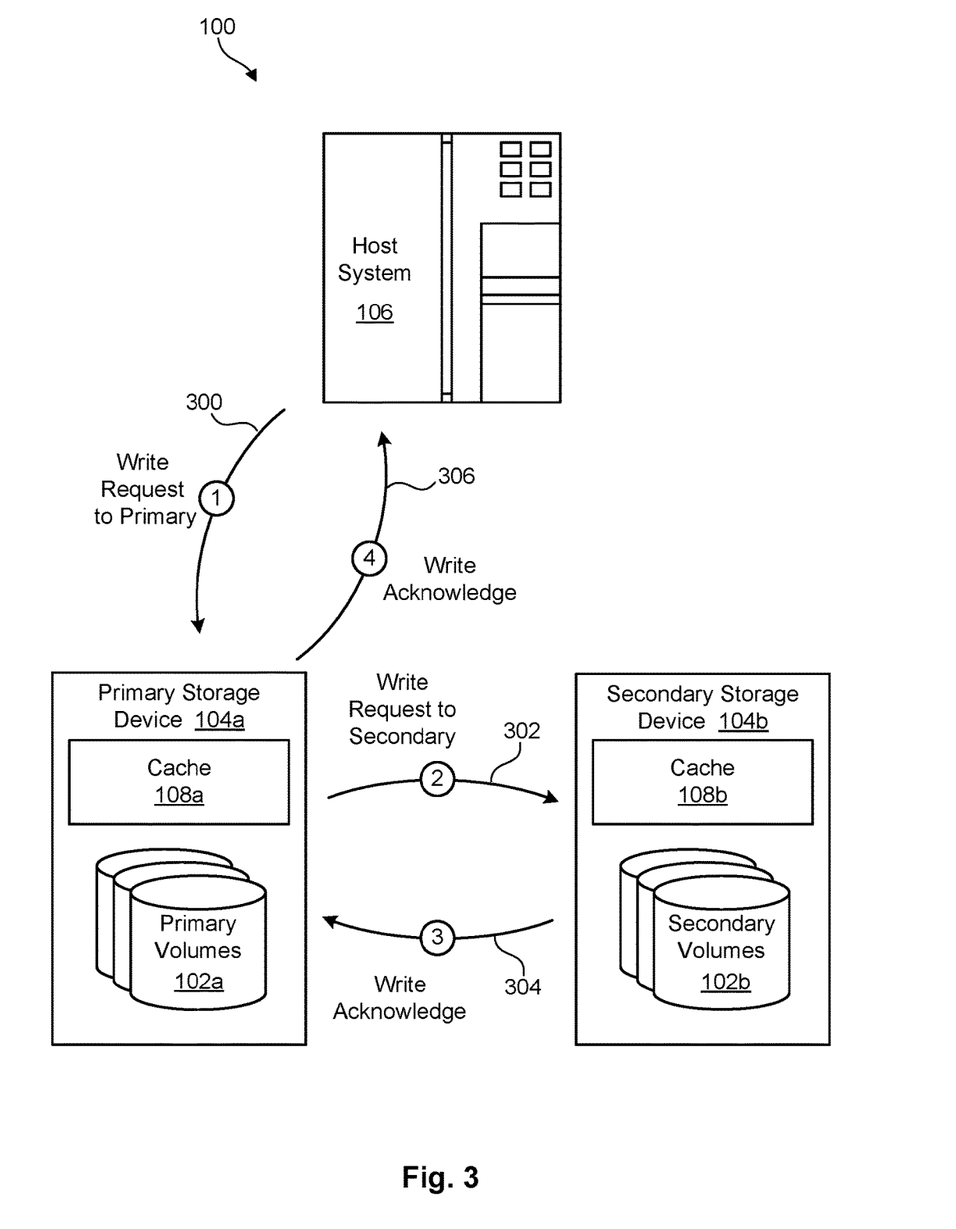
FIG. 3 is a high-level block diagram showing processing of a write request in the system of FIG. 1.

By contrast, asynchronous operation may only require that the write complete on the primary storage device 104a before the write is considered complete. That is, a write acknowledgement may be returned to the host system 106 when the write has completed on the primary storage device 104a, without requiring that the write also be completed on the secondary storage device 104b. The write may then be mirrored to the secondary storage device 104b as time and resources allow to create a consistent copy on the secondary storage device 104b.

Referring again to FIG. 1, as shown, each of the primary storage device 104a and secondary storage device 104b may include cache 108a, 108b. Whenever a storage device 104 receives a read request from a host system 106, the storage device 104 may first check its cache 108 to determine whether the requested data is stored therein. If so, the storage device 104 may retrieve the data from its cache 108 and return it to the host system 106. If the data is not stored in its cache 108, the storage device 104 may fetch the data from its volumes 102 (typically disk and/or solid state drives), return the data to the host system 106, and save it in its cache 108 in the event it is requested again. If the data is requested again by a host 106, the storage device 104 may fetch the data from its cache 108 instead of fetching it from its volumes 102, saving both time and resources.

In a similar manner, when a storage device 104 receives a write request, the storage device 104 may store the write in its cache 108 and destage the write to its volumes 102 at a later time. The write may be considered complete when it is written to its cache 108 as opposed to when it is destaged to its volumes 102. In general, the cache 108 may accelerate reads and writes and generally enhance I/O performance.

Figure 2:
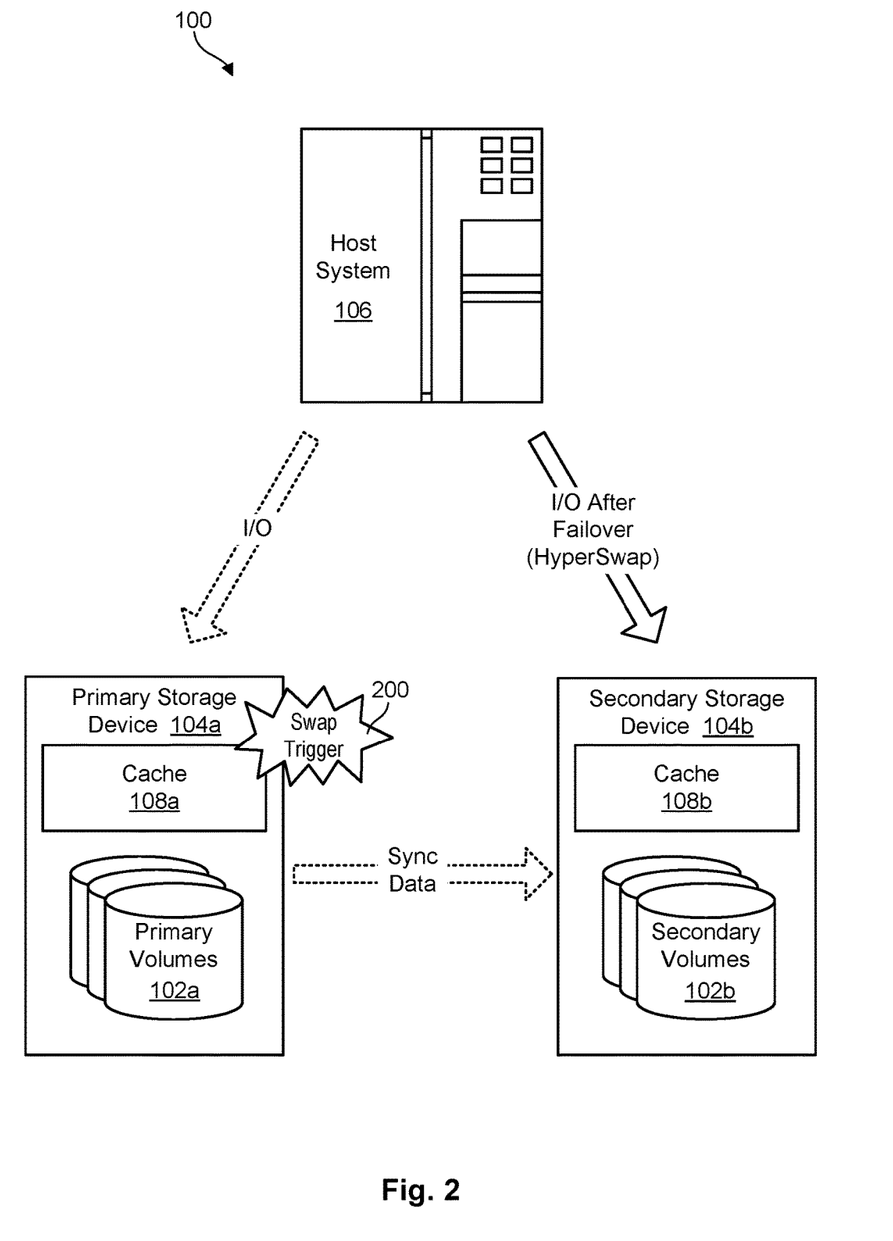
FIG. 2 is a high-level block diagram showing behavior of the system of FIG. 1 after a swap trigger.

Referring to FIG. 2, in the event the primary storage device 104a fails, I/O may be redirected to the secondary storage device 104b, thereby enabling continuous operations. This process may be referred to as a swap or HyperSwap. Since the secondary storage device 104b contains a consistent copy of the data on the primary storage device 104a, the redirected I/O (e.g., reads and writes) may be performed on the copy of the data on the secondary storage device 104b. When the primary storage device 104a is repaired or resumes operation, mirroring may be restarted in the opposite direction to make device 104b the new primary storage device and device 104a the new secondary storage device. Alternatively, I/O may be resumed to the primary storage device 104a after it has been updated with data from the secondary storage device 104b, while data mirroring may be resumed to the secondary storage device 104b.

Although the systems and methods disclosed herein will be discussed primarily in association with PPRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

As previously mentioned, HyperSwap is a function provided by IBM's z/OS operating system that provides continuous availability for disk failures by maintaining synchronous copies of data on primary disk volumes 102a on secondary disk volumes 102b. When a disk failure is detected at a primary site 104a, a host system 106 running the z/OS operating system identifies HyperSwap-managed volumes 102a at the primary site 104a. Instead of rejecting I/O requests, the host system 106 uses the HyperSwap function to switch (or swap) information in internal control blocks so that I/O requests are driven against synchronous copies at the secondary site 104b, as shown in FIG. 2. Such an operation may also be referred to as a "failover." Since the secondary volumes 102b contain identical copies of data in the primary volumes 102a prior to the failure, the I/O requests will ideally succeed with minimal (i.e. a slight delay in I/O response time) impact on the issuing applications. This functionality masks disk failures from applications and ideally avoids application or system outages. An event which initiates a HyperSwap may be referred to as a "swap trigger" 200.

Figure 4:
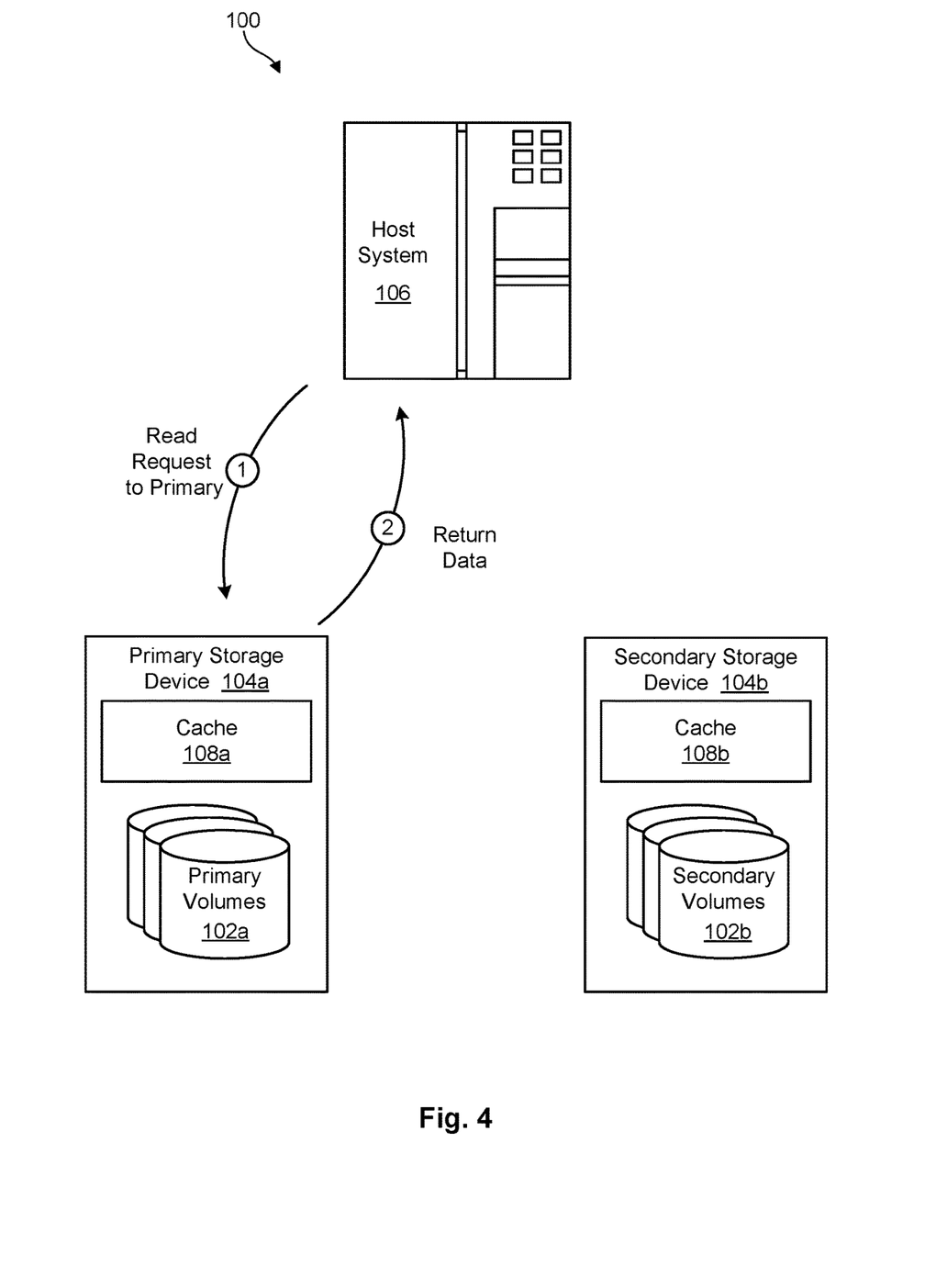
FIG. 4 is a high-level block diagram showing processing of a read request in the system of FIG. 1.

Referring to FIGS. 3 and 4, unfortunately, in conventional PPRC systems 100, I/O performance before and after a HyperSwap event may not be equivalent. This may be in large part due to the way that cache 108 is populated in conventional PRRC systems. For example, as shown in FIG. 3, during normal PPRC operation, writes may be mirrored from the primary storage device 104a to the secondary storage device 104b. This allows the writes to be cached not only in the cache 108a of the primary storage device 104a, but also in the cache 108b of the secondary storage device 104b. However, as shown in FIG. 4, reads may be performed exclusively at the primary storage device 104a since no data is modified and thus there is no need to replicate changes to the secondary storage device 104b. Because read requests are typically not propagated to the secondary storage device 104b, cache 108b at the secondary storage device 104b may not be populated with reads in the same way as cache 108a at the primary storage device 104a. The data that is stored in each cache 108a, 108b may vary significantly, particularly in PPRC systems 100 with high read workloads.

The result of this variation may be evident what a HyperSwap event occurs. In particular, I/O performance may decrease when I/O is redirected to the secondary storage device 104b since the cache 108b at the secondary site is not populated with the same data as cache 108a at the primary site. The I/O performance may remain impaired until the cache 108b at the secondary site can be populated to reflect the actual read and write workload originating from the host system 106. The cache 108b at the secondary storage device 104b may gradually be populated as read and write requests are received from the host system 106, but may nevertheless result in decreased I/O performance in the interim, which may be on the order of hours or days.

Figure 5:
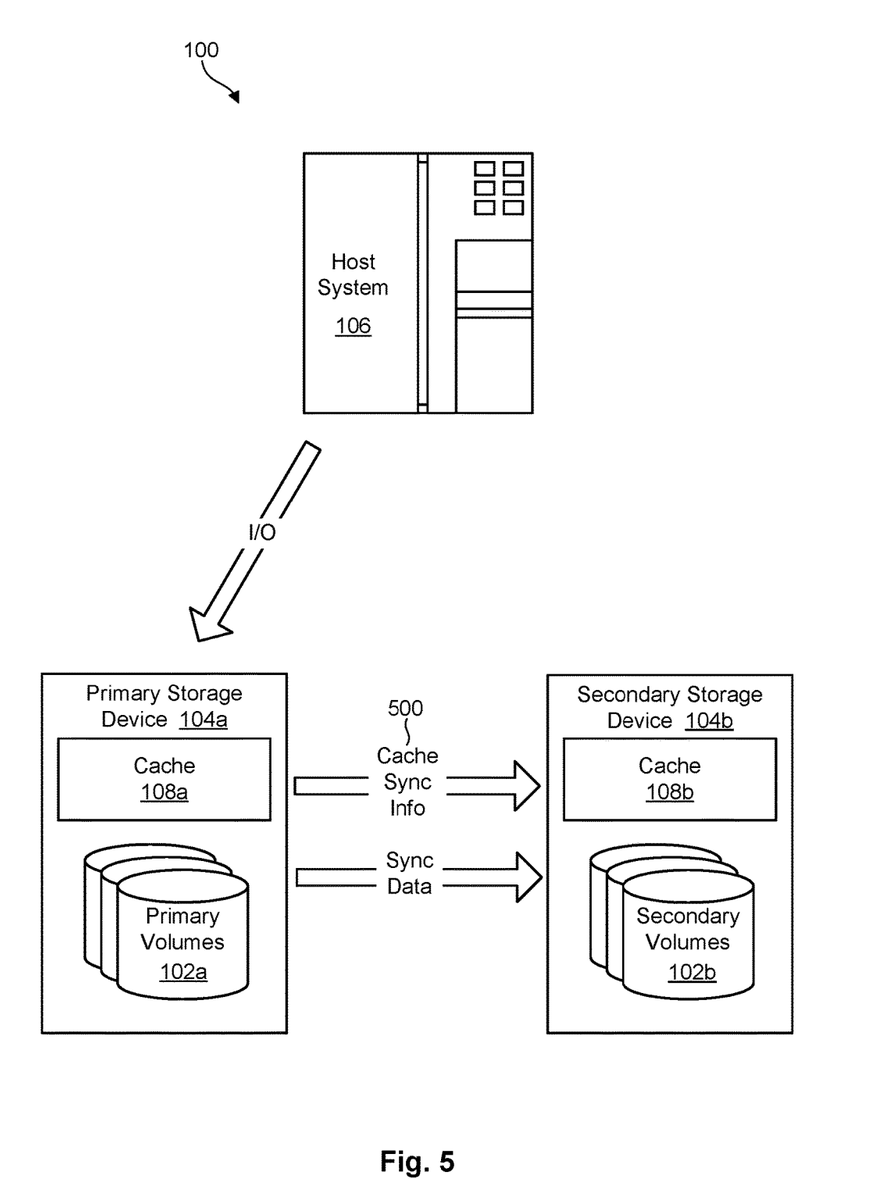
FIG. 5 is a high-level block diagram showing a technique for synchronizing the secondary read cache with the primary read cache.

Referring to FIG. 5, in order to address the deficiencies identified above, systems and methods in accordance with the invention may provide functionality to ensure that cache 108a, 108b at the primary and secondary sites are substantially synchronized. As shown in FIG. 5, in certain embodiments, cache synchronization information 500 may be periodically transmitted from the primary storage device 104a to the secondary storage device 104b so that the secondary storage device 104b can updates its cache 108. The information that is contained in the cache synchronization information 500 and the times or intervals in which the cache synchronization information 500 is transmitted from the primary storage device 104a to the secondary storage device 104b may vary in different embodiments. For example, in certain embodiments, the cache synchronization information 500 is transmitted during periods of low or reduced I/O to reduce competition with the mirroring of production data. Ideally, the cache synchronization information 500 is tailored or designed to minimize bandwidth utilization between the primary and secondary storage devices 104a, 104b.

In one embodiment, the cache synchronization information 500 contains a list of storage elements that are cached in the primary read cache 108a (a "read cache" will be defined as that part of the cache 108 used to store data as a result of read operations). This list may include all storage elements that are cached in the primary read cache 108a, such as when the secondary read cache 108b is initially synchronized with the primary read cache 108a. Subsequently, the list may include only those storage elements that have been added and/or removed from the primary read cache 108a since the last time the list was communicated to the secondary storage device 104b. Storage elements may be added to the primary read cache 108a in response to reads received by the primary storage device 104a from a host system 106. Storage elements may be removed from the primary read cache 108a in accordance with a cache eviction policy. Such a policy may cause storage elements to be removed from the primary read cache 108a when they have reached a certain age, have not been accessed for a prescribed period of time, or cannot be accommodated in the primary read cache 108a due to it being full or reaching a maximum capacity. To keep the secondary read cache 108b substantially synchronized with the primary read cache 108a, removals may be communicated to the secondary storage device 104b along with additions, particularly in embodiments where the secondary storage device 104b is unaware of the "heat" (i.e., frequency of access) of the underlying storage elements.

Alternatively, "heat" information associated with the storage elements may be included in the cache synchronization information 500. That is, the cache synchronization information 500 may include a list of storage elements stored in the primary read cache 108a along with the heat of each storage element. Heat information may be provided in the form of colors, numbers, or codes that represent the access frequency of a storage element, or an actual access frequency such as a number of reads per time period. This heat information may enable the secondary storage device 104b to prioritize the storage elements in the secondary read cache 108b. Hotter storage elements may be retained in the secondary read cache 108b while colder storage elements may be evicted as space is needed. By communicating "heat" information to the secondary storage device 104b, bandwidth between the primary storage device 104a and secondary storage device 104b may be reduced as it may reduce the need to communicate with the secondary storage device 104b each time a read is received at the primary storage device 104a (thereby allowing the secondary storage device 104b to maintain its own "heat" information). When the heat of the storage elements is known, the secondary storage device 104b may perform its own cache eviction policy, which may be the same as or similar to the cache eviction policy used by the primary storage device 104a.

In alternative embodiments, the cache synchronization information 500 may be made up exclusively of heat information (as opposed to indicating which storage elements are stored in the primary read cache 108a). The secondary storage device 104b may then decide which storage elements to store in the secondary read cache 108b based on this heat information. In particular, the secondary storage device 104b may move hotter storage elements into the secondary read cache 108b (if not there already), and evict colder storage elements. Ideally, this will result in a secondary read cache 108b that is populated in much the same way as the primary read cache 108a.

In certain embodiments, the cache synchronization information 500 omits information that would provide a minimal or negligible performance improvement at the secondary storage device 104b in the event of a failover. For example, in cases where the primary read cache 108a is populated with storage elements due to a large sequential read (i.e., a disk access pattern whereby large continuous blocks of data are read from adjacent locations on the disk), it may be unnecessary to include this information in the cache synchronization information 500. In the event the same read is made to the secondary storage device 104b, cache hints may be provided to the secondary storage device 104b that indicate that the read is sequential. In such cases, the secondary storage device 104b will know to pre-stage the sequential data to the secondary read cache 108b. Thus, this information may be omitted from the cache synchronization information 500 since it will provide little if any performance improvement at the secondary storage device 104b in the event of a failover.

Alternatively, the cache synchronization information 500 may be configured to include information with respect to a first storage element or group of storage elements associated with a sequential read, thereby allowing these storage elements to be cached in the secondary read cache 108b, while omitting storage elements after the first storage element or group of storage elements, since these storage elements will be automatically pre-staged in the secondary read cache 108b. This may reduce or eliminate any small performance hit that may occur at the secondary storage device 104b by the first storage element or group of storage elements being missing from the secondary read cache 108b at the time of the sequential read.

Other types of information may also be removed or filtered from the cache synchronization information 500 as needed. For example, if the primary storage device 104a has knowledge of storage elements that are already stored in the secondary read cache 108b, the primary storage device 104a may omit this information from the cache synchronization information 500 since it may be redundant and/or unnecessary. Similarly, if the primary storage device 104a has already provided certain cache synchronization information 500 in the past and the information has not changed, this information may be omitted from the cache synchronization information 500 in the future. Other techniques for reducing the size of the cache synchronization information 500 are possible and within the scope of the invention.

Figure 6:
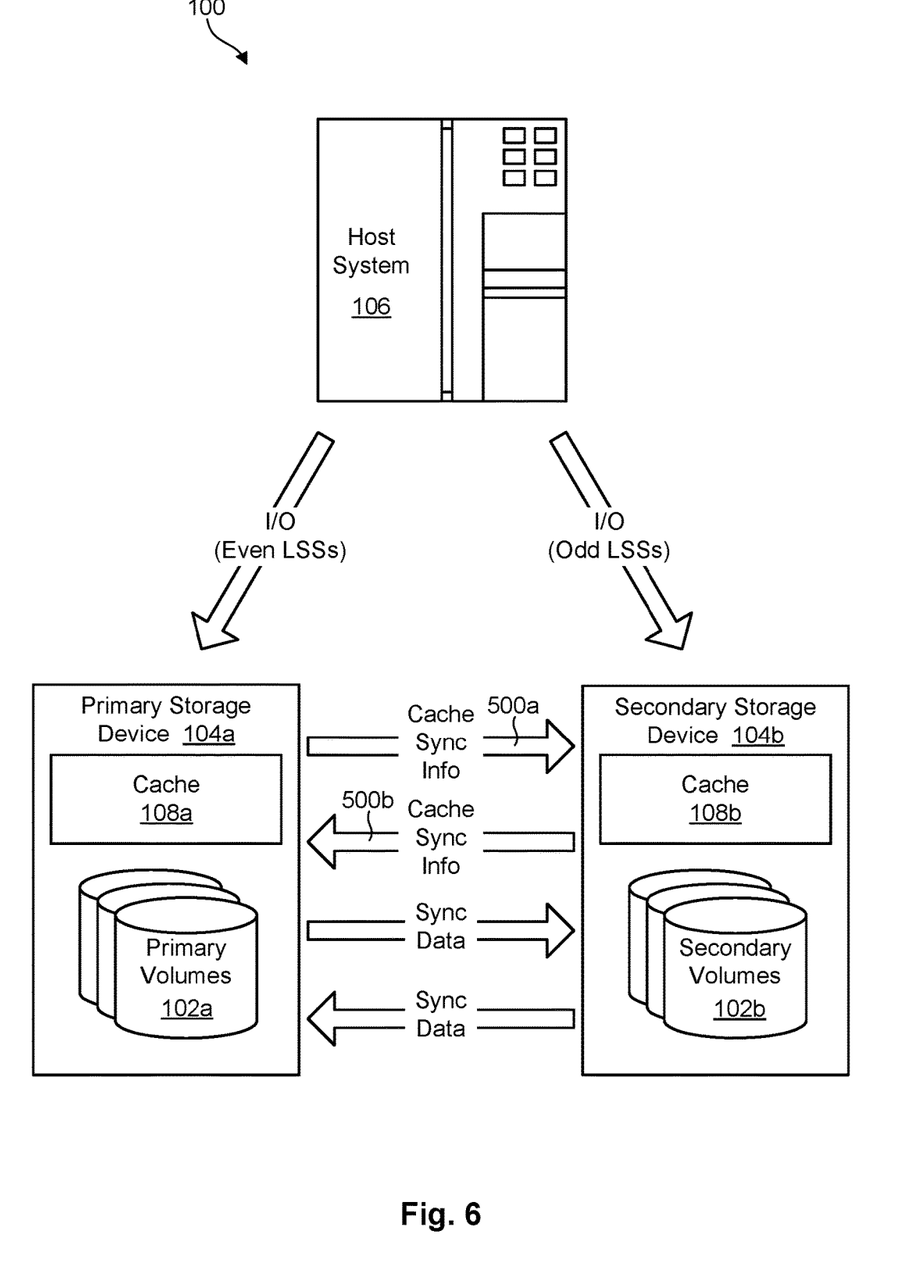
FIG. 6 is a high-level block diagram showing a technique for synchronizing the primary and secondary read cache in a bi-directional data replication environment.

Referring to FIG. 6, in certain embodiments, a data replication system 100 in accordance with the invention may be configured to be bi-directional and/or balance I/O directed to the primary and secondary storage devices 104a, 104b. That is, the data replication system 100 may be configured to direct some I/O to the primary storage device 104a, while directing other I/O to the secondary storage device 104b. For example, a host system 106 may be configured to direct I/O associated with even logical subsystems (LSSs) to the primary storage device 104a, and I/O associated with odd LSSs to the secondary storage device 104b. The data may be mirrored in opposite directions as shown in FIG. 6. This may provide a more balanced configuration under normal operating conditions.

In the event the primary storage device 104a fails, the host system 106 may failover to the secondary storage device 104b and all I/O may be directed to the secondary storage device 104b. Similarly, in the event the secondary storage device 104b fails, the host system 106 may failover to the primary storage device 104a and all I/O may be directed to the primary storage device 104a. If the primary read cache 108*a* and secondary read cache 108*b* are not synchronized, I/O performance may decrease in either scenario. Thus, systems and method are needed to ensure that the primary and secondary read cache 108*a*, 108*b* are substantially synchronized in bi-directional data replication systems 100.

As shown in FIG. 6, in certain embodiments, cache synchronization information 500 may flow in both directions in a bi-directional data replication system 100. That is, cache synchronization information 500*a* may flow from the primary storage device 104*a* to the secondary storage device 104*b*, and cache synchronization information 500*b* may flow from the secondary storage device 104*b* to the primary storage device 104*a*. The cache synchronization information 500*a* may be used to synchronize the secondary read cache 108*b* with the primary read cache 108*a*. Similarly, the cache synchronization information 500*b* may be used to synchronize the primary read cache 108*a* with the secondary read cache 108*b*.

Each of the cache sync synchronization information 500*a*, 500*b* illustrated in FIG. 6 may, in certain embodiments, have all or part the characteristics of the cache synchronization information 500 described above in association with FIG. 5. In addition, the cache synchronization information 500*a*, 500*b* may, in certain embodiments, have other characteristics due to the bi-directional configuration of the data replication system 100. For example, functionality may be provided to eliminate or reduce an amount of redundant information that is transmitted between the primary storage device 104*a* and secondary storage device 104*b*.

For example, when the secondary storage device 104*b* receives cache synchronization information 500*a* from the primary storage device 104*a*, the secondary storage device 104*b* may compare the cache synchronization information 500*a* to storage elements that are already stored in the secondary read cache 108*b*. This may enable the secondary storage device 104*b* to determine which storage elements are stored in the secondary read cache 108*b* but not in the primary read cache 108*a*. These storage elements may be included in cache synchronization information 500*b* that is transmitted from the secondary storage device 104*b* to the primary storage device 104*a* so that the primary read cache 108*a* can be synchronized with the secondary read cache 108*b*. Thus, one or more of the primary storage device 104*a* and secondary storage device 104*b* may be configured to compare the cache synchronization information 500 that it receives with the contents of its cache 108 so that its outgoing cache synchronization information 500 can be tailored accordingly. This will ideally remove unnecessary and/or superfluous information from the cache synchronization information 500*a*, 500*b*.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for synchronizing primary and secondary read cache in a data replication environment, the method comprising:

monitoring contents of a primary read cache, the primary read cache configured to cache data in primary volumes located at a primary site, wherein the primary volumes are in a mirroring relationship with secondary volumes located at a secondary site;

periodically sending, from the primary site to the secondary site, first information describing the contents of the primary read cache; and using, at the secondary site, the first information to update a secondary read cache configured to cache data in the secondary volumes, thereby causing the secondary read cache to be populated with reads to the primary volumes and the secondary volumes, despite the secondary read cache not acting as read cache for read requests that are directed to the primary volumes.

2. The method of claim 1, further comprising:

monitoring contents of the secondary read cache at the secondary site;

periodically sending, from the secondary site to the primary site, second information regarding the contents of the secondary read cache; and using, at the primary site, the second information to update the primary read cache.

3. The method of claim 2, wherein periodically sending the second information comprises filtering out redundancy between the second information and the first information.

4. The method of claim 1, wherein the first information contains a list of storage elements cached in the primary read cache.

5. The method of claim 4, wherein the first information includes temperature information indicating access frequency of the storage elements.

6. The method of claim 1, wherein the first information contains changes to the contents of the primary read cache since the first information was previously sent to the secondary site.

7. The method of claim 1, wherein the first information omits information providing a minimal performance improvement in the event of a failover to the secondary site.

8. A computer program product for synchronizing primary and secondary read cache in a data replication environment, the computer program product comprising a computer-readable storage medium having computer-usable program code embodied therein, the computer-usable program code comprising:

computer-usable program code to monitor contents of a primary read cache, the primary read cache configured to cache data in primary volumes located at a primary site, wherein the primary volumes are in a mirroring relationship with secondary volumes located at a secondary site;

computer-usable program code to periodically send, from the primary site to the secondary site, first information describing the contents of the primary read cache; and computer-usable program code to use, at the secondary site, the first information to update a secondary read cache configured to cache data in the secondary volumes, thereby causing the secondary read cache to be populated with reads to the primary volumes and the secondary volumes, despite the secondary read cache not acting as read cache for read requests that are directed to the primary volumes.

9. The computer program product of claim 8, wherein the computer-usable program code further comprises:
computer-usable program code to monitor contents of the secondary read cache at the secondary site;
computer-usable program code to periodically send, from the secondary site to the primary site, second information regarding the contents of the secondary read cache; and
computer-usable program code to use, at the primary site, the second information to update the primary read cache.

10. The computer program product of claim 9, wherein periodically sending the second information comprises filtering out redundancy between the second information and the first information.

11. The computer program product of claim 8, wherein the first information contains a list of storage elements cached in the primary read cache.

12. The computer program product of claim 11, wherein the first information includes temperature information indicating access frequency of the storage elements.

13. The computer program product of claim 8, wherein the first information contains changes to the contents of the primary read cache since the first information was previously sent to the secondary site.

14. The computer program product of claim 8, wherein the first information omits information providing a minimal performance improvement in the event of a failover to the secondary site.

15. A system for synchronizing primary and secondary read cache in a data replication environment, the system comprising:
at least one processor;
at least one memory device coupled to the at least one processor and storing instructions for execution on the at least one processor, the instructions causing the at least one processor to;
monitor contents of a primary read cache, the primary read cache configured to cache data in primary volumes located at a primary site, wherein the primary volumes are in a mirroring relationship with secondary volumes located at a secondary site;
periodically send, from the primary site to the secondary site, first information describing the contents of the primary read cache; and
use, at the secondary site, the first information to update a secondary read cache configured to cache data in the secondary volumes, thereby causing the secondary read cache to be populated with reads to the primary volumes and the secondary volumes, despite the secondary read cache not acting as read cache for read requests that are directed to the primary volumes.

16. The system of claim 15, wherein the instructions further cause the at least one processor to:
monitor contents of the secondary read cache at the secondary site;
periodically send, from the secondary site to the primary site, second information regarding the contents of the secondary read cache; and
use, at the primary site, the second information to update the primary read cache.

17. The system of claim 16, wherein periodically sending the second information comprises filtering out redundancy between the second information and the first information.

18. The system of claim 15, wherein the first information contains a list of storage elements cached in the primary read cache.

19. The system of claim 18, wherein the first information includes temperature information indicating access frequency of the storage elements.

20. The system of claim 15, wherein the first information contains changes to the contents of the primary read cache since the first information was previously sent to the secondary site.

* * * * *